March 19, 1963 — G. T. HEMMETER — 3,081,817
DEVICE FOR SLITTING TIRE TREADS
Filed Jan. 11, 1960 — 2 Sheets-Sheet 1

INVENTOR.
GEORGE T. HEMMETER
Lothrop & West
ATTORNEYS

March 19, 1963  G. T. HEMMETER  3,081,817
DEVICE FOR SLITTING TIRE TREADS
Filed Jan. 11, 1960  2 Sheets-Sheet 2
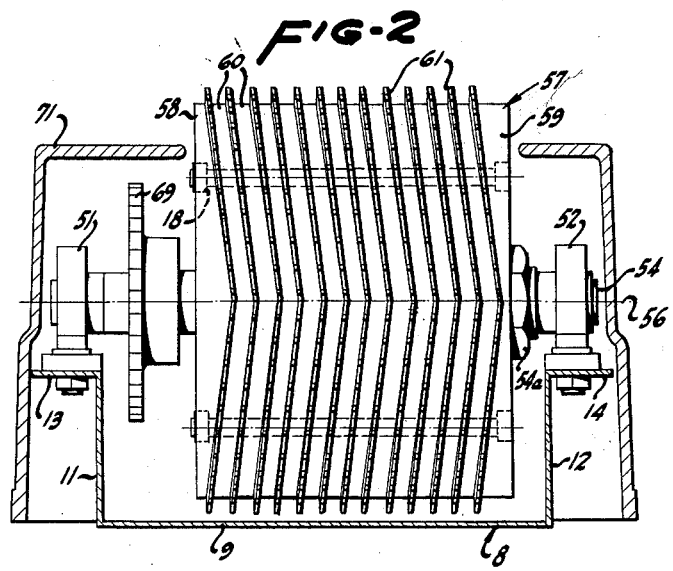
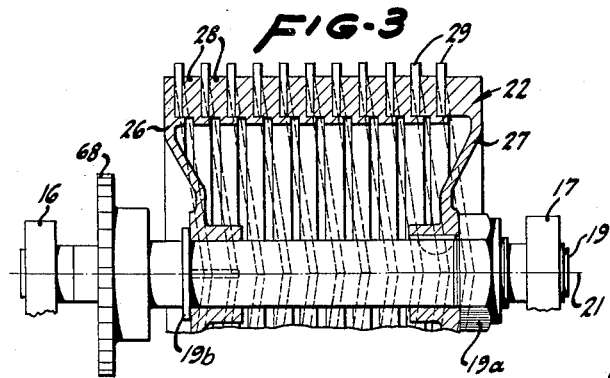
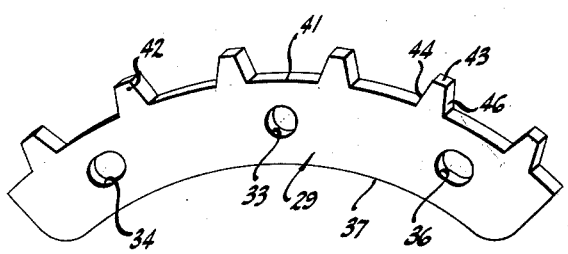
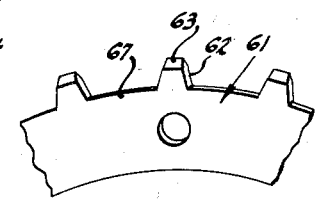
INVENTOR.
GEORGE T. HEMMETER
Lothrop & West
ATTORNEYS

United States Patent Office 3,081,817
Patented Mar. 19, 1963

3,081,817
DEVICE FOR SLITTING TIRE TREADS
George T. Hemmeter, 10791 Magdalena Ave.,
Los Altos, Calif.
Filed Jan. 11, 1960, Ser. No. 1,598
3 Claims. (Cl. 157—13)

My invention relates to a mechanism especially useful in connection with pneumatic tire casings for operating upon the tread of the tire in such a way as to improve its anti-skidding properties.

Various devices are known for operating upon tire treads; for example, devices useful especially on automobile tires for making transverse tread cuts, for removing portions of the tread and for lacerating the tread with pinholes. This latter method and apparatus for performing it are disclosed in Patent 2,504,090 issued April 11, 1950 to C. W. Sanderson.

While various methods of treating the tread of a tire are variously effective, most of them have a difficulty in that substantial tread rubber is removed. While the anti-skid properties may be improved somewhat, the amount of wearing material remaining is reduced. It is also the case that some methods permit the incursion of foreign and deleterious bodies into the tire tread so as to reduce the mileage. In some instances, although the results are reasonably good, the process requires specialized attention and occupies a protracted time whereas in other cases elaborate machinery is necessary to get the desired result.

It is therefore an object of my invention to provide a device for treating tires which can be utilized effectively without substantial removal of any tread stock.

Another object of the invention is to provide a device for treating tires which is extremely easy to operate and in practice can be utilized by virtually any mechanic without much prior instruction or skill.

A still further object of the invention is to provide a device for treating tires in such a way as to avoid tearing or removing the tread stock.

Another object of the invention is to provide a device for treating tires which will accomplish the intended purpose in an extremely short period of time.

Another object of the invention is, in general, to provide an improved device for treating tires.

Another object of the invention is to provide a means for processing a vehicular tire on the car to increase its skid resistance in a sidewise direction.

Another object of the invention is to provide a device for processing a vehicular tire on the car to increase the coefficient of sliding and static friction between the tire and the supporting pavement in a fore and aft direction.

Another object of the invention is to provide a device for processing a vehicular tire on the car to increase the static and sliding coefficient of friction between the tire and the supporting surface in either sidewise direction.

A still further object of the invention is to provide a means for processing a vehicular tire to increase its coefficient of friction with supporting surfaces without materially affecting the tire's ability to withstand wear.

Other objects of the invention, together with the foregoing, are attained in the embodiment of the invention described in the accompanying description and illustrated in the accompanying drawings, in which:

FIGURE 2 is a cross-section, the plane of which is indicated by the line 2—2 of FIGURE 1, the drum and appurtenances being shown in elevation.

FIGURE 3 is a detail cross-section, the plane of which is indicated by the line 3—3 of FIGURE 1.

FIGURE 4 is an isometric view of a driving plate.

FIGURE 5 is a fragmentary view of a cutter blade.

Figure 1:
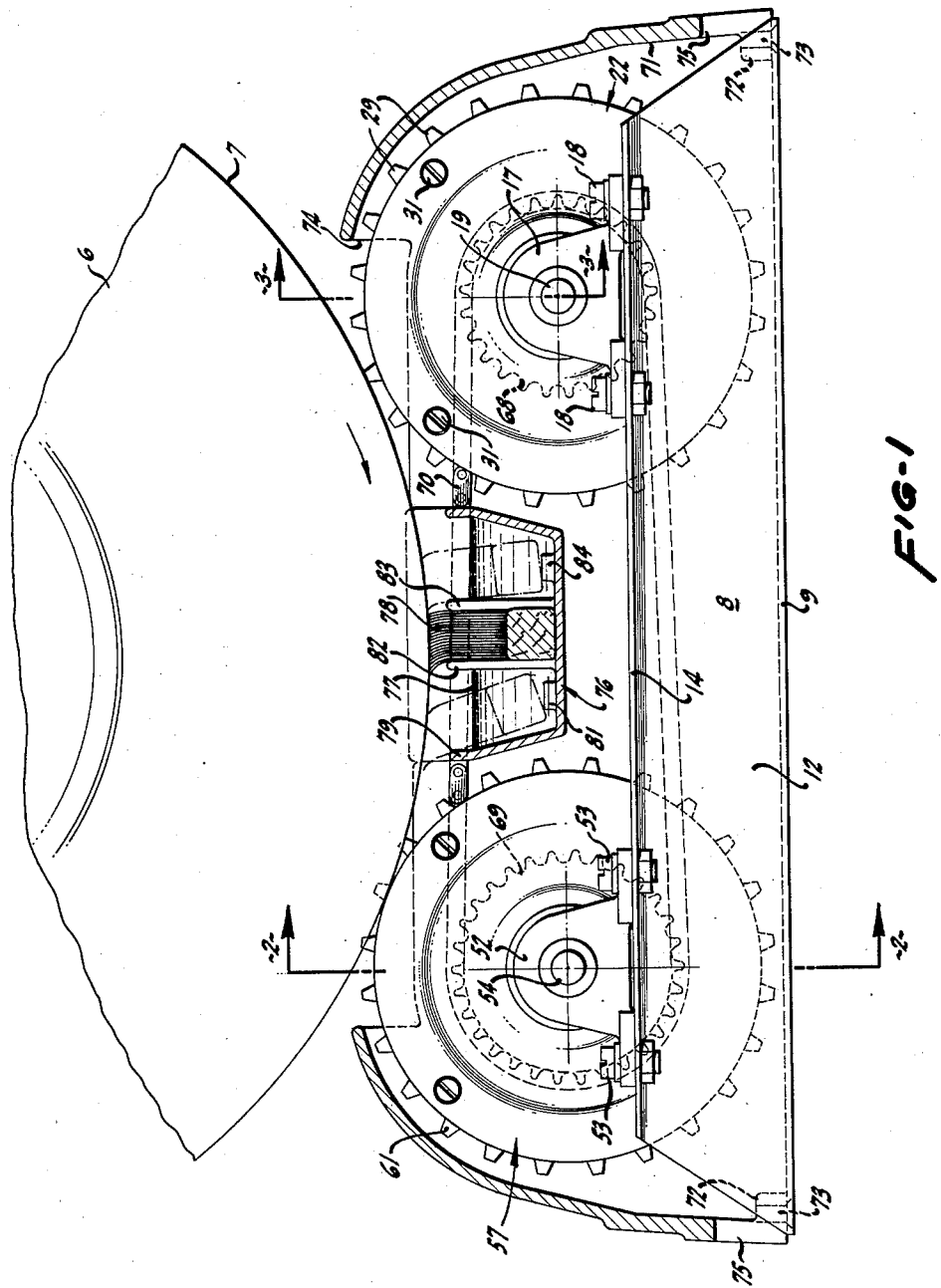
FIGURE 1 is a side elevation of the interior of a device pursuant to the invention, the casing and certain interior portions being shown in cross-section and with a portion of a vehicle tire in operating position thereon.

While the device for treating tires is primarily useful in connection with automobile tires in general, it is also useful in connection with truck and earth mover tires and with all rubber wheels in which an anti-skid factor is important. It is described herein as it is used on an ordinary automobile tire. It is understood that customarily a tire 6 is mounted on the rear driving wheel of an automobile, and that the tire on its periphery 7 is covered with tread rubber in some effective pattern as is usual.

In accordance with the invention, there is provided a frame 8 conveniently fabricated of an appropriately folded metal sheet to afford a bottom 9, sides 11 and 12 and flanges 13 and 14. Toward one end of the frame 8 there are mounted pillow bearings 16 and 17 which conveniently are anti-friction bearings. These are secured to the frame by connectors 18 operating in elongated openings in the flanges 13 and 14 so that the bearings can be transversely aligned in any selected position, within limits.

The bearings 16 and 17 support a first transverse shaft 19 (FIG. 3) for rotation about a first axis 21 extending transversely of the frame 8 and parallel to the axis of rotation (not shown) of the tire 6. Secured on the shaft 19 and rotatable in unison therewith is a first drum 22. This is a composite structure, parts of which are more particularly disclosed in my copending application entitled Hub, filed January 11, 1960, Serial No. 1,597. The drum 22 has opposing heads 26 and 27 between which are located drum rings 28 with driving plates 29 therebetween. Through fasteners 31 (FIG. 1) and shaft nut 19A and shaft shoulder ring 19B (FIG. 3) draw and hold the heads 26 and 27 together and the intervening rings 28 and plates 29 in position so that the assembled drum 22 constitutes a roughly circular cylindrical member.

The driving plates 29 have a particular form, as illustrated in FIGURE 4. Each of the driving plates is preferably a metal member of substantial thickness throughout and of an arcuate contour, being substantially a segment of an annulus. Adjacent its middle, the plate 29 has an aperture 33 designed to fit over an adjacent one of the fasteners 31. Additional, elongated openings 34 and 36 are provided for use in manufacture and for additional through bolts if desired. The inner periphery 37 of the driving plate 29 is of an arcuate configuration designed to fit against a subjacent portion 38 of either the head 26 or of a ring 28 to position the driving plate with its outer periphery in a circular pattern about the axis 21.

The outer periphery of the driving plate 29 is partly defined by arcuate portions 41 interrupted by outstanding driving lugs 42. The top 43 and the sides 44 and 46 of the lugs are flat, thick and blunt so as not to cut or lacerate impinging surfaces with which they may contact. The lugs 42 are preferably, although not necessarily, evenly spaced and are symmetrically disposed with respect not only to the central openings 33 but with respect to the ends of the driving plate 29.

While the driving plate 29 is preferably formed from flat stock, it can be any form to effectively cleat the drum surface to the supported tire. Successive or adjacent segment portions of the drum are oppositely pitched helices. This gives approximately the appearance shown in FIGURE 2. However, any arrangement of driving lugs to give effective slip-free power drive from the tire to the drum is satisfactory.

The pitch of the helices and the spacing between the plates 29 is such that as the drum 22 is revolved all of an adjacent surface is, in effect, swept over or "scanned" in a zigzag fashion by the plates 29 and particularly the lugs 42 thereon. In other words, the plates 29 do not revolve in planes normal to the axis 21 but are disposed, in effect, or approximately, at a slight or small angle thereto, the angle reversing with respect to the normal plane in each successive quadrant of the drum. While the lugs 42 are originally planar when formed and for approximate consideration are planar, they are slightly warped or bent when assembled and clamped and so do not occupy planes of revolution normal to the axis 21 but are slightly inclined with respect thereto. The lugs 42 in one quadrant are inclined away from the normal plane in one direction whereas the lugs 42 in the successive quadrant are inclined away from the normal plane in approximately the same amount but in the opposite direction.

Also mounted on the frame 8 are pillow bearings 51 and 52 (FIG. 2) secured to the flanges 13 and 14 by fasteners 53 in elongated openings so that the axis of the bearings can be positioned at a desired distance away from the bearings 16 and 17 and can be arranged in parallel alignment therewith. Adapted to operate in the bearings 51 and 52 is a cross-shaft 54 rotatable about a second axis 56 parallel to the first axis 21. A drum 57 is fixed on the second shaft 54 for rotation in unison therewith. The drum 57 itself is identical in construction with the drum 22 and so includes heads 58 and 59 and intervening rings 60 but has cutter blades 61 with knives 62 instead of driving plates with lugs. For convenience, the cutter blades have similar profiles as the driving plates shown in FIGURE 4 but they are uniformly thinner in cross-section and the protuberant knives 62 are sharpened at their edge 63, as shown in FIGURE 5. Preferably, for convenience, the drum 57 is made of parts identical to those used in the fabrication of the drum 22 and is similarly held together with identical through bolts 66 and between shaft nut 54A and opposing shaft ring or shoulder (not shown). This is for ease and economy of manufacture and assembly.

The profile of the cutting knives 62, for these reasons, is also initially made to be substantially identical with the driving plates 29. Only the material thickness is varied. In fact, the same manufacturing tools are utilized for initially stamping both, although the knife material is usually different. While the knife profile is identical with the plates 29 as shown in FIGURE 4 as to general contour and positioning, the knives differ in thickness and in that the edge 63 is sharpened so that it is not flat as is the case with the plates. The arcuate portions 67, however, of each knife are not sharpened and are below the outer circular peripheral surface of the heads 58 and 59 and of the rings 60 but remain of full blade thickness.

With this arrangement, there is provided on the frame 8 a first drum 22 having a good friction or traction surface provided by the plates 29 and the lugs 42 projecting therefrom and a second drum 57 which is manufactured in substantially the same way and of parts having substantially the same dimensions and size but which has a number of sharp knives projecting from its periphery. The knives, like the lugs, when the drum 57 is rotated in effect scan an adjacent surface.

In accordance with the invention, it is desired that the two drums 22 and 57 rotate simultaneously and in the same direction but at different peripheral speed. While it is possible to utilize drums of different diameters running at the same rotational speed, manufacturing considerations make identical drums preferable with a variance in the interconnecting drive.

The first shaft 19 is provided with a chain sprocket 68 of a predetermined diameter fixed to the shaft. The second shaft 54 is provided with a chain sprocket 69 fixed to the shaft and of a diameter somewhat larger than that of the sprocket 68. A link chain 70 encompasses the sprockets.

Although it is not essential, it is preferred to provide the frame 8 with a housing 71. This is preferably a light member having lugs 72 in appropriate locations to receive fastenings 73 for securing the housing 71 on the frame 8 in a location to enclose most of the parts but to leave an opening 74 at the central top portion. Finger lift openings 75 are also left at both ends.

Suitably supported on the housing 71 above the frame 8 is a tank 76 having a compartment 77 therein for the reception of a suitable liquid, such as water or any good rubber lubricant or cutting compound. Within the compartment 77, a brush 78 may be first disposed against the rearward wall 79 of the compartment and on an upstanding, short lug 81. The worn brush is then transferred to a central position between two short walls 82 and 83. Finally, the brush is moved to rest against the wall 83 and on a short lug 84. In this way, maximum life is gotten out of the brush which is effective to transfer lubricant in all positions onto the tire.

In the use of this device, the frame 8 is positioned on a firm support, such as a floor, and the automobile tire 6 is lowered thereon. The tire preferably is still mounted on the vehicle which is initially jacked up on both sides and is then slightly lowered on one side so that the tire 6 rests upon the two drums 22 and 57. The periphery 7 of the tire also deflects the bristles of the brush 78. The tire 6 is supported so that the axis of its rotation is exactly parallel with the first axis 21 and the second axis 56. This can be accomplished by a suitably sized block or chock under the opposite vehicle wheel.

When the weight of the tire 6 and the portion of the vehicle it supports are imposed upon the drums 22 and 57, certain different actions occur with each drum. The lugs 42, being blunt, depress into the rubber but do not in any wise penetrate the rubber periphery of the tire 6 but form a good lugged driving engagement therewith. On the contrary, the cutting knives having about the same profile shape as the lugs 42, but being sharpened, may but do not necessarily penetrate into the tread rubber of the tire periphery as the rubber tread is aborted until it rests upon the intervening rings of the second drum 57.

When the tire 6 has been appropriately so positioned, the wheel is driven by the vehicle power in the direction of the arrow (FIG. 1), that is, so that its periphery 7 moves from the driving drum 22 toward the cutting drum 57. When power is applied, there is virtually no slip due to the cleating action of the lugs 42 between the tire 6 and the driving drum 22, the lugs 42, in effect, "gearing" the driving drum to the tire. This operates the transmission chain 70 and rotates the cutting drum 57 in the same direction as the driving drum 22. Since the sprockets 68 and 69 are of different diameters, the drum 57 operates at a different peripheral speed than does the drum 22. Preferably, and since the sprocket 69 is larger than the sprocket 68, the cutting drum 57 has a slower peripheral speed than that of the driving drum 22.

The effect of rotating the mechanism under power from the tire 6 is to drive the individual knives to enter into the tread rubber of the tire. Since the knife speed and the tire speed are somewhat different, each knife makes a generally longitudinal or circumferential cut in the rubber of the tire, the cut being longer than the knife. The greater the difference in speeds, the longer is the cut. Since the knives are not quite in the plane of rotation but are alternately first slanted in one direction out of the plane of rotation for one segment and then slanted in the opposite direction out of the plane of rotation for the succeeding segment, the transverse movement of the tire in slashing past the cutter knives is alternately reversed and transverse displacement of the tire is balanced. Each blade is displaced circumferentially, thus enlarging the cut circumferentially so that the knife is easily withdrawn from the just-made cut.

The cutter blades are positioned so that their knives effectively scan the surface of the tire. Thus, the pitch of the right- and left-hand helices is equal to the axial or parallel distance between the blades. In other words, the successive knives, being zigzagged an amount at least as great as the transverse distance between them, during several rotations of the tire 6 provide a plurality of cuts all over the surface of the tire. Should the knives mesh with previous cuts, no harm is done to the tire. Processing is continued until the entire peripheral surface of the tire is evenly treated or "tractionated."

While it is possible to have the knives arranged, in effect, in one or more unidirectional and continuous helices entirely around and across the cutting drum and, for that matter, similarly to arrange the lugs on the driving drum, this has the disadvantage of requiring lateral support against axial shifting of the tire on the drum or drums. By providing the alternating helical arrangement of the knives, a transverse force in one direction is nullified by an opposite transverse force as the tire is skidded over the cutting surface so that the tire runs truly on both of the drums. Inasmuch as the tire rolls over the driving lugs, their geometric arrangement on the drum is inconsequential.

It is to be particularly noted that the sharp knives actually cut into and are drawn a short distance through the rubber before emerging. They do not pull or distort or deflect the rubber in any substantial amount circumferentially. That is to say, the knives actually cut and do not tear or gouge or remove rubber or act in the manner of a tack buffer which is often utilized to remove rubber tread from a casing.

The cutting action may be enhanced by water or other comparable material contained in the tank 76. The liquid is fed along the bristles of the brush 78 onto the tire periphery just before the tire surface encounters the knives. The brush 78 can initially be started in the compartment 77 when it is new and has long bristles and as it wears down can be moved into the other compartments until it is worn out. Preferably, if water is used in the container 76 it has a rust-proofing additive so that splash does not adversely affect the mechanism.

The tire 6 is rotated for a plurality of rotations on the mechanism a convenient time of operation. With the tire 6 traveling at an approximate road speed of 30 miles an hour (if the differential is non-locking and the opposite wheel is blocked, this is indicated as 15 miles an hour on the vehicle speedometer), the elapsed treatment time should be of the order of 30 seconds. With the ordinary size vehicle tire and the usual sizes and ratios of the parts, substantially as shown in FIGURE 1, a treating operation of this duration produces over a half million short cuts in the tire tread periphery. Since these are in fact cuts and there is substantially no gouging or tack effect, little or no rubber is removed from the tire 6 and little or no rubber dust or debris remains behind. The slashing or cutting action can be amplified by increasing the differential of speeds between the driving and cutting drums; that is, by changing the drive ratio of the drive sprockets. Also, adding more knives alters the tractionating pattern.

At the end of the operation, the wheel is lifted from the apparatus and the tire is ready for anti-skid service. The apparatus is then available for a subsequent use. In the practical operation of a tire casing 6 so treated, it is found that the cuts, when displaced in a sidewise direction, tend to act somewhat as squeegees against transverse and slipping forces. When the tire is under load either by driving or when braking, the slashes are opened up to form a modified oval form, thus providing a squeegee action in either the fore or aft direction. Thus, the frictional adhesion is materially improved by the mechanical shape produced by the tire at the point of contact with the road.

Depending upon the angularity and positioning of the knives, the number of rotations of the wheel during treatment and comparable factors, all of the cuts made in the casing may not be distinct or discrete but various cuts may intersect or elongate other cuts. In appearance, a tire casing treated as described does not reveal any special difference from a standard casing except upon extremely close inspection. Since no rubber is removed at all and since the side walls of the cuts are clean, there is substantially no change in the appearance of the tire tread under any usual or ordinary inspection.

What is claimed is:

1. A device for treating tires comprising a frame, a first drum, means for supporting said first drum on said frame for rotation about a first axis, means on said first drum for substantially non-slip driving engagement with a tire having the rotational axis thereof parallel to said first axis, a second drum, means for supporting said second drum on said frame for rotation about a second axis parallel to said first axis, a plurality of peripherally spaced cutting knives arranged on said second drum for circumferential cutting engagement with said tire, and means for transmitting driving force from said first drum to drive said second drum about said second axis at a different peripheral speed from that of said first drum about said first axis.

2. A device for treating tires comprising a frame, a first drum, means for supporting said first drum on said frame for rotation about a first axis, means on said first drum for substantially non-slip driving engagement with a tire resting thereon, a second drum, means for supporting said second drum on said frame for rotation about a second axis parallel to said first axis, a plurality of peripherally spaced cutting knives arranged on said second drum for circumferential cutting engagement with said tire resting thereon, a first sprocket concentric with said first axis and secured to said first drum and being the only drive connection therewith, a second sprocket concentric with said second axis and secured to said second drum and being the only drive connection therewith, said sprockets being of different diameters, and a chain engaging said sprockets only and constituting the sole driving connection from said first drum to said second drum, whereby said knives have a different peripheral speed than said tire.

3. A device for treating a tire comprising a frame, a pair of rolls mounted on said frame to turn thereon about parallel transverse axes and in spaced opposing relation to cradle a tire thereon for circumferential rotation, one of said rolls having a surface adapted to engage the tread of said tire substantially without slip, a multiplicity of knives on the other of said rolls, said knives being disposed substantially in planes normal to said axes and being adapted to make substantially circumferential cuts in said tire, and means for connecting said rolls to rotate simultaneously but at different peripheral speeds.

References Cited in the file of this patent

UNITED STATES PATENTS

| | | |
|---|---|---|
| 525,052 | Marble | Aug. 28, 1894 |
| 1,353,936 | Prantner | Sept. 28, 1920 |
| 2,262,596 | Watkins | Nov. 11, 1941 |
| 2,504,090 | Sanderson | Apr. 11, 1950 |
| 2,570,540 | Furnald | Oct. 9, 1951 |
| 2,649,665 | Anderson et al. | Aug. 25, 1953 |
| 2,651,893 | Braley | Sept. 15, 1953 |
| 2,737,237 | Herzegh | Mar. 6, 1956 |
| 2,741,307 | Meserve et al. | Apr. 10, 1956 |
| 2,918,116 | Mooney | Dec. 22, 1959 |
| 2,924,267 | Meserve et al. | Feb. 9, 1960 |